(12) United States Patent
Arulambalam et al.

(10) Patent No.: US 7,461,214 B2
(45) Date of Patent: Dec. 2, 2008

(54) METHOD AND SYSTEM FOR ACCESSING A SINGLE PORT MEMORY

(75) Inventors: Ambalavanar Arulambalam, Macungie, PA (US); David E. Clune, Califon, NJ (US); Yun Peng, Shanghai (CN); Qian Gao Xu, Shanghai (CN); Jun Chao Zhao, Shanghai (CN)

(73) Assignee: Agere Systems Inc., Allentown, PA (US)

( * ) Notice: Subject to any disclaimer, the term of this patent is extended or adjusted under 35 U.S.C. 154(b) by 182 days.

(21) Appl. No.: 11/273,750

(22) Filed: Nov. 15, 2005

(65) Prior Publication Data

US 2007/0113023 A1 May 17, 2007

(51) Int. Cl.
*G06F 13/16* (2006.01)
(52) U.S. Cl. .................................................... 711/150
(58) Field of Classification Search .......... 711/147–153
See application file for complete search history.

(56) References Cited

U.S. PATENT DOCUMENTS

| | | | |
|---|---|---|---|
| 5,371,877 A | 12/1994 | Drako et al. | |
| 5,553,269 A * | 9/1996 | Nunes | 703/21 |
| 5,659,687 A * | 8/1997 | Kim et al. | 710/112 |
| 5,937,169 A | 8/1999 | Connery et al. | |
| 5,974,482 A | 10/1999 | Gerhart | |
| 6,449,656 B1 | 9/2002 | Elzur et al. | |
| 6,453,394 B2 | 9/2002 | Miki et al. | |
| 6,697,868 B2 | 2/2004 | Craft et al. | |
| 6,732,252 B2 | 5/2004 | Miki et al. | |
| 6,788,704 B1 | 9/2004 | Lindsay | |
| 6,868,459 B1 | 3/2005 | Stuber | |
| 6,876,941 B2 | 4/2005 | Nightingale | |
| 6,920,510 B2 | 7/2005 | Chang et al. | |
| 7,085,866 B1 * | 8/2006 | Hobson et al. | 710/117 |
| 7,287,102 B1 * | 10/2007 | White et al. | 710/34 |
| 2004/0042483 A1 | 3/2004 | Elzur et al. | |
| 2004/0133713 A1 | 7/2004 | Elzur | |
| 2004/0153578 A1 | 8/2004 | Elzur | |
| 2004/0249957 A1 | 12/2004 | Ekis et al. | |
| 2005/0021680 A1 | 1/2005 | Ekis et al. | |

OTHER PUBLICATIONS

Tanenbaum, Andrew S., Structured Computer Organization, 1984, Prentice-Hall, Inc., pp. 10-12.*
ARM, AMBA AXI Protocol v 1.0 Specification, Copyright 2003, 2004, 108 pages.
ARM, The Architecture for the Digital World, http://www.arm.com/products/CPUs/, Sep. 1, 2005.

(Continued)

*Primary Examiner*—Kevin Ellis
(74) *Attorney, Agent, or Firm*—Duane Morris LLP; Steven E. Koffs

(57) ABSTRACT

In a method of accessing a single port memory, a plurality of read commands are received from a plurality of requestors for memory read access. A respective plurality of parameters corresponding to each of the plurality of read commands is stored in a memory read command queue. The parameters corresponding to one of the read commands are retrieved from the memory read command queue when the single port memory provides the data corresponding to that read command. One or more of the parameters from the memory read command queue are provided while providing the data from the memory.

20 Claims, 7 Drawing Sheets

OTHER PUBLICATIONS

ARM, The Architecture for the Digital World, http://www.arm.com/contact_us/offices.html/, Sep. 1, 2005.

Information Sciences Institute University of Southern California, Transmission Control Protocol Darpa Internet Program Protocol Specification, Sep. 1981, pp. 1-88, Marina del Rey, California.

ARM, Advanced High-Performed Bus (AHB), AMBA AHB, ARM IHI 0011A, © Copyright ARM Limited 1999, Chapter 3, pp. 3-1-3-54.

ARM, AMBA Specification, Rev. 2.0, ARM, 1999, 34 pages.

* cited by examiner

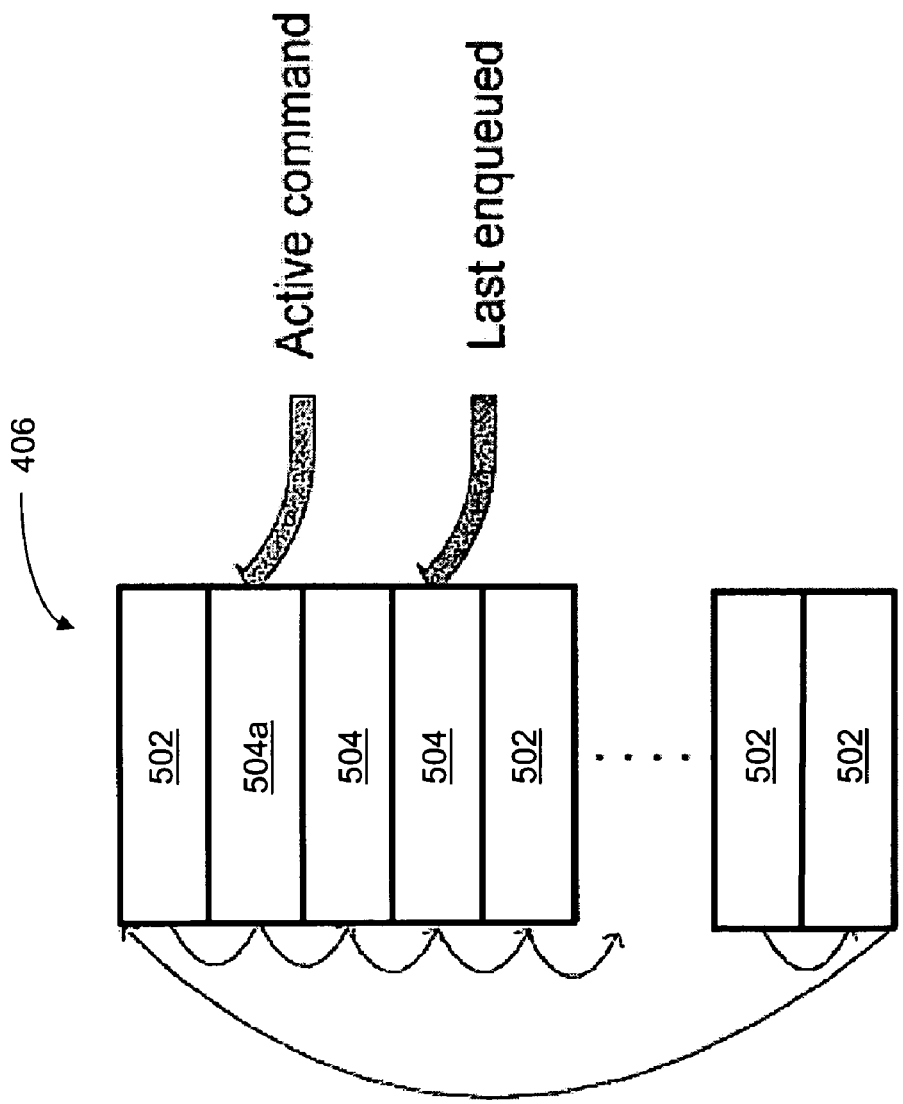

METHOD AND SYSTEM FOR ACCESSING A SINGLE PORT MEMORY

FIELD OF THE INVENTION

The present invention relates to computer memory generally, and particularly to methods to control access to a memory.

BACKGROUND

Single port and dual port RAM devices are known in the art. Dual port RAMs allow read and write operations to and from the RAM to occur independently, so that a read operation may be performed from one address at the same time that a write operation is performed to another address. Because these read and write operations occur independently, separate read and write clocks may be used. This makes the dual port RAM advantageous for use as a buffer between two systems operating at different frequencies. However, a dual port RAM has a larger memory cell size than that of a single port RAM.

A single port RAM is significantly smaller than a dual port RAM having the same capacity, but only one memory cell may be accessed at any given time, and only one operation may be performed at a time. Therefore, single port RAM has not been used as extensively as dual port RAM for applications that involve the buffering of data, and when they were used, designers commonly included large data buffers to hold read/write data.

When designers have tried to use a single port RAM for buffering data from multiple, concurrent data streams, the results have typically been suboptimal memory bandwidth allocations, poor scalability (when the number of concurrent sessions increases), and large intermediate buffering.

SUMMARY OF THE INVENTION

Some embodiments provide a method for controlling access to a single-port memory. A plurality of memory requesters are polled to enable the plurality of memory requesters to access a single port memory during respective allocated time slots. Each one of the plurality of memory requestors is granted access to the single-port memory during its allocated time slot, if that requestor requests access to the single-port memory. An excess bandwidth requestor is granted access to the single port memory during a time slot allocated to one of the plurality of memory requestors that does not request access to the single-port memory during its allocated time slot.

Some embodiments provide a method of accessing a single port memory. A plurality of read commands are received from a plurality of requestors for memory read access. A plurality of parameters corresponding to each of the plurality of read commands is stored in a memory read command queue. The parameters corresponding to one of the read commands are retrieved from the memory read command queue when the single port memory provides the data corresponding to that read command. One or more of the parameters from the memory read command queue are provided along with the data provided by the memory.

BRIEF DESCRIPTION OF THE DRAWINGS

FIG. 5 is a diagram of the memory read command queue shown in FIG. 4.

DETAILED DESCRIPTION

This description of the exemplary embodiments is intended to be read in connection with the accompanying drawings, which are to be considered part of the entire written description.

Figure 1:
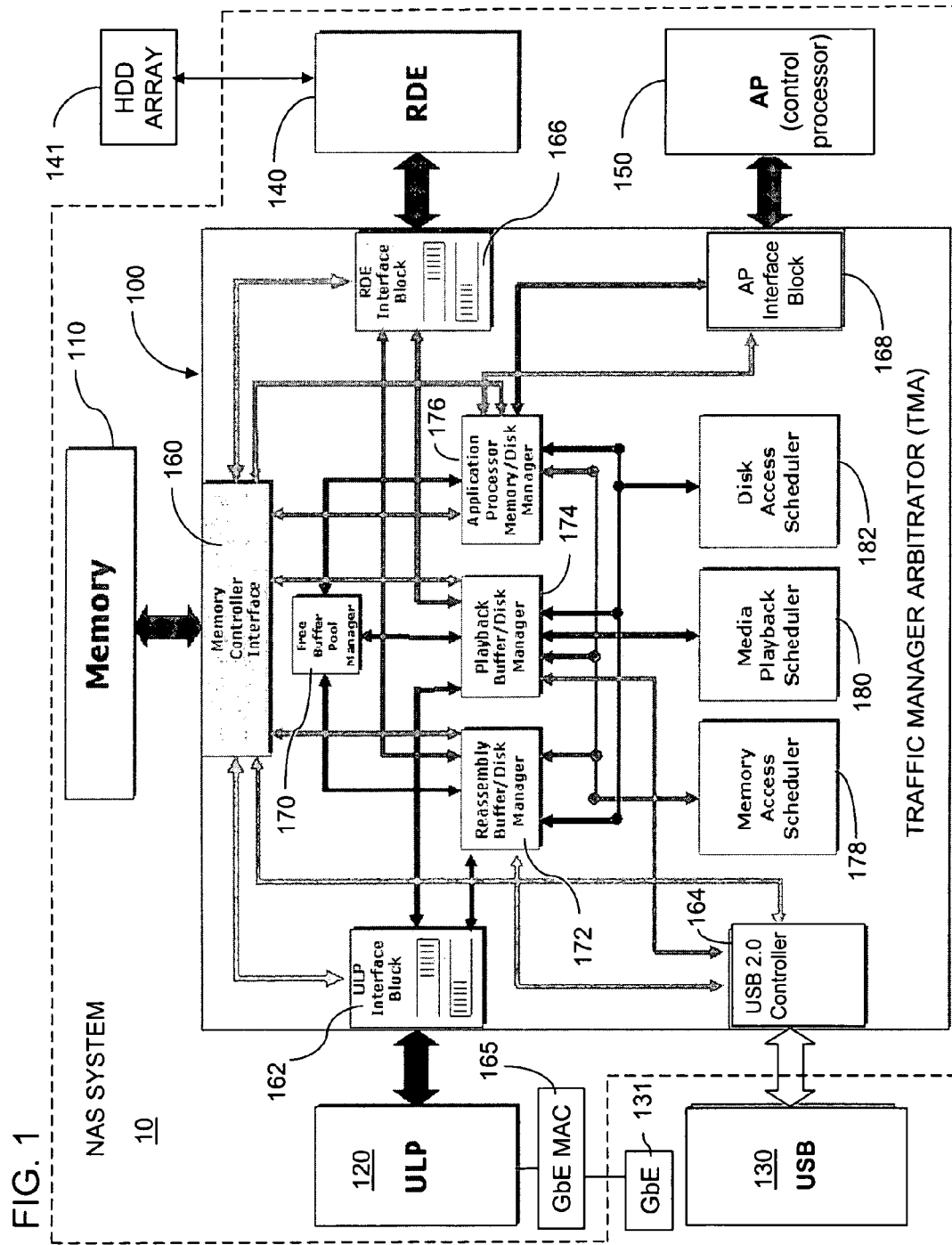
FIG. 1 is a block diagram of a network attached storage system.

FIG. 1 is a block diagram of an exemplary media server and network attached storage (NAS) system 10. In NAS system 10, data from multiple sessions are concurrently stored to a disk array 141, played out to devices on a home network via USB port 130 or Ethernet port 131, and/or used for control traffic. The term "session" broadly encompasses any open connection that has activity, in which data are being received from the media interface and stored in the disk 141, being read out from the disk 141 to a local device or a network, or any open connection used by control processor (application processor) 150 for processor functions that operate system 10 (e.g., retrieving data or instructions from memory). The sessions use a shared memory 110 as an intermediate storage medium.

Media Server

The NAS system 10 is connected to input sources, such as a USB device 130 or an Ethernet local area network 131, and one or more mass storage devices, such as a hard disk drive (HDD) array 141. In system 10, data from multiple media sessions are simultaneously being stored to the disk array 141, and played out from the disk array 141 to devices (e.g., PCs, TVs with network capabilities, digital video recorders (DVRs), personal video recorders (PVRs), and the like, not shown) on a home network. The various communications paths in system 10 are also used for control traffic sessions. The term, "session" denotes an open connection that has activity. For example, in a receive session, data are being received from the media interface, reassembled and stored in a disk of HDD array 141. In a transmit session, data are read out from a disk of HDD array 141 (or other mass storage device), for playback on a TV, stereo, computer or the like. In a control processor session, an open connection is used by the control processor 150 for processor needs, such as retrieving data to be loaded into registers within system 10. All the sessions use a shared memory 110 as an intermediate medium.

In some embodiments, the memory 110 is implemented by a single-port DDR-2 DRAM. Double Data Rate (DDR) synchronous dynamic random access memory (SDRAM) is high-bandwidth DRAM technology. DDR SDRAM is cost-effective and suitable for a variety of processing market segments. DDR SDRAM has been used with data rates of 200 MHz, 266 MHz, 333 and 400 MHz buses. Other types of memory may be used to implement shared memory 110.

The system 10 includes a Traffic Manger Arbitrator (TMA) 100, which includes an exemplary memory controller interface 160 further described below. The TMA block 100 manages i) storage of media streams arriving via network 131, ii) handling of control traffic for application processing, and iii) playback traffic during retrieval from the HDD array 141. The TMA 100 controls the flow of all traffic among the network interface 165, USB controller 164, DDR2 memory 110, application processing functions 150, and the HDD array 141. The TMA 100 includes i) four buffer managers 170, 172, 174, 176 that handle memory buffer and disk management, and ii) three schedulers 178, 180, 182, that allocate the available memory access bandwidth of memory 110.

A reassembly buffer/disk manager (RBM) 172 manages the transfer of control packets or packetized media objects from the network interface 131 to the memory 110 for reassembly, and then, if appropriate, the transfer of the control packets or packetized media objects to the HDD array 141.

A media playback buffer/disk manager (PBM) 174 manages the transfer of data out of HDD array 141 to the memory 110, and then the transfer of the data from memory 110 to the upper layer protocol accelerator (ULP) 120 or USB controller 164 during playback.

The application processor memory manager (AMM) 176 provides the appropriate interfaces for control processor operations based on the data stored in the disks of HDD array 141 and the memory 110.

A free buffer pool manager (FBM) 170 allocates and de-allocates buffers when needed by the RBM 172, PBM 174 or AMM 176 and maintains a free buffer list, which free buffer list may be a last-in, first-out (LIFO) queue.

The memory access scheduler (MAS) 178, media playback scheduler (MPS) 180, and disk access scheduler (DAS) 182 manage the shared resources, such as memory access bandwidth and disk access bandwidth. The schedulers 178, 180 and 182 also provide a prescribed quality of service (QoS), in the form of allocated bandwidth and latency guarantees for media objects during playback. MAS 178 provides the RBM 172, PBM 174 and the AMM 176 guaranteed memory access bandwidth. MPS 180 arbitrates among multiple media transfer requests and provides allocated bandwidth and ensures continuous playback without any interruption. DAS 182 provides guaranteed accesses to the disk for the re-assembly process, playback process and AP access.

The TMA 100 interfaces to at least five modules/devices:

(1) memory 110, which can be a shared, single-port memory (such as a single-port DDR RAM);

(2) ULP accelerator 120, which offloads routine, repetitive TCP tasks from the host processor 150. Optionally, a local area network (LAN) port 131 is connected via ULP accelerator 120 using a LAN protocol, such as Gigabit Ethernet (GbE);

(3) USB 130 via USB controller 164;

(4) one or more non-volatile storage devices shown as, for example, the HDD array 141; and (5) AP 150, which may be an embedded ARM926EJ-S core by ARM Holdings, plc, Cambridge, UK, or other embedded microprocessor.

The memory controller interface 160 provides the interface for managing accesses to the memory 110 via a single memory port. An RDE Interface block 166 provides the interface to an RDE module 140 (where "RDE" denotes RAID decoder encoder, and "RAID" denotes a redundant array of inexpensive disks), which is in turn connected to the HDD array 141. The ULP Interface block 162 provides the interface to the ULP 120. A network interface block, GbE MAC 165, provides the interface to the local area network, GbE 131. The USB controller 164 provides the interface between the TMA 100 and the USB 130 (USB port 130 might preferably be a USB 2.0 (or higher) port). The Memory control Interface (TDI) block 160 provides an interface to the shared memory 110. An AP Interface block 168 provides an interface to the AP 150.

The system 10 receives media objects and control traffic from the network port 131 and the objects/traffic are first processed by the local area network controller (e.g., Gigabit Ethernet controller GbE MAC 165) and the ULP block 120. The ULP 120 transfers the media objects and control traffic to the TMA 100, and the TMA 100 stores the arriving traffic in the shared memory 110. In the case of media object transfers, the incoming object data are temporarily stored in the memory 110, and then transferred to the RDE 140 for storage in the HDD array 141. The TMA 100 also manages the retrieval requests from the disk of HDD array 141 toward the LAN interface 131. While servicing media playback requests, the data are transferred from the disks of HDD array 141 and stored in buffers in memory 110. The data in the buffers are then transferred out to the GbE port 131 via the ULP accelerator 120. The data are formed into packets for transmission using TCP/IP, with the ULP accelerator 120 performing routine TCP protocol tasks to reduce the load on the control processor 150. The TMA 100 manages the storage to and retrieval from the HDD array 141 by providing the appropriate control information to the RDE 140.

The control traffic destined for inspection by the control processor 150 is also stored in the shared memory 110, and the control processor 150 is given access to read the packets in memory 110. The control processor 150 also uses this mechanism to re-order any of the packets received out-of-order. A part of the shared memory 110 and disk 141 contains program instructions and data for the control processor 150. The TMA 100 manages the access to the memory 110 and disk 141 by transferring control information from the disk to memory and memory to disk. The TMA 100 also enables the control processor 150 to insert data and extract data to and from an existing packet stream.

The MAS 178 is responsible for the bandwidth distribution among each media session, while the memory controller interface 160 is responsible for managing all the memory accesses via a single memory port.

Memory Access Scheduler

Each of the various types of media streams involves a respectively different set of data transfers to and from the memory 110 that are under control of MAS 178.

The re-assembly and data storage process includes the following four steps:

(1) receiving data from the Ethernet port 131 or from the peripheral (e.g., USB) port 130;

(2) writing the data to the shared DDR memory 110;

(3) reading the data from the shared memory 110; and (4) writing the data to the disk array 141.

The media playback process includes the following four steps:

(1) accessing and receiving data from disk array 141;

(2) writing the data to shared memory 110;

(3) reading the data from shared memory 110; and (4) sending the data to the Ethernet port 131 or USB port 130.

The control processor's data transfer from memory 110 to disk 141 includes the following two steps:

(1) reading the data from shared memory 110; and (2) writing the data to the disk array 141.

The control processor's data transfer from disk 141 to memory 110 includes the following two steps:

(1) reading the data from the disk array 141; and (2) writing the data to the shared memory 110.

Additionally, the controller processor 150 may write to or read from the memory 110 directly without writing to or reading from the disk array 141.

Thus, memory write operations include re-assembly media write, playback media write, control processor data transfer from disk 141 to memory 110, and control processor direct write memory operations. Memory read operations include re-assembly read, playback read (data sent out toward GbE port 131 or peripheral port USB 130), control processor data transfer from memory 110 to disk of HDD array 141 and control process read data from memory to the processor 150 itself.

Figure 2:
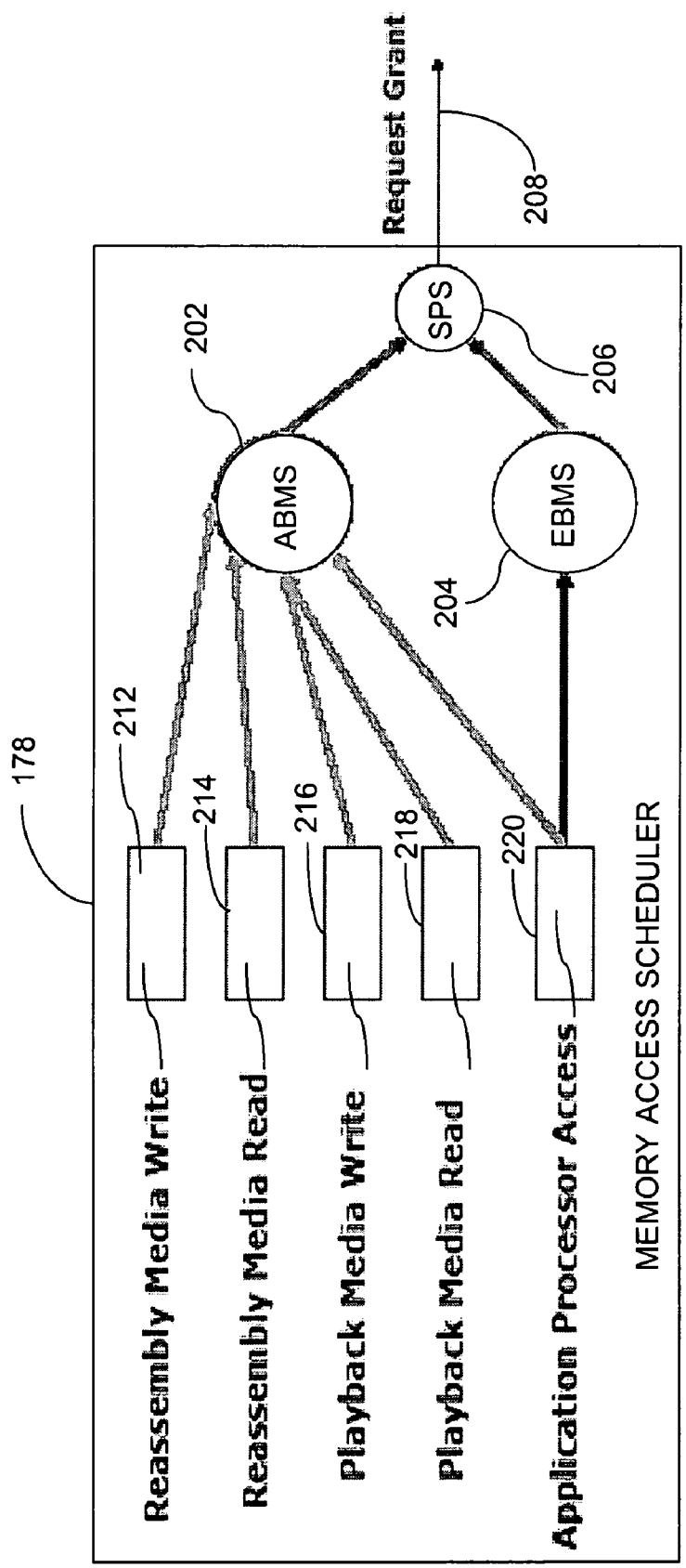
FIG. 2 is a block diagram of the memory access scheduler shown in FIG. 1.

The MAS 178 and the memory controller interface 160 of the TMA 100 work together to make efficient and effective use of the memory access resources. FIG. 2 is a block diagram of an exemplary embodiment of the memory access scheduler (MAS) 178, which provides a prescribed QoS (by pre-allocated time slots and round-robin polling) to a plurality of requests having different request types.

The MAS 178 services two types of requesters: "allocated bandwidth requester" and "excess bandwidth requester". An "allocated bandwidth requestor" is allocated memory access during periodic time slots. If any "allocated bandwidth requester" does not need to access the memory during one of its allocated time slots, then memory access during that time slot (during the current cycle of time slots) is granted to an "excess bandwidth requester" instead. During the next cycle of time slots, the MAS 178 again makes that time slot available to the requestor that did not use its last timeslot.

The MAS 178 has three schedulers: an allocated bandwidth memory scheduler (ABMS) 202, an excess bandwidth memory scheduler (EBMS) 204, and a strict priority scheduler (SPS) 206. The ABMS 202 grants each one of a plurality of allocated bandwidth memory requestors access to the single-port memory 110 during its allocated time slot, if that requestor requests access to the single-port memory. The EBMS 204 grants an excess bandwidth requestor access to the single port memory 100 during a time slot allocated to one of the plurality of allocated bandwidth memory requestors that does not request access to the single-port memory 110 during its allocated time slot. If the ABMS 202 and the EBMS 204 both request memory access during the same timeslot, for the exemplary embodiment the SPS 206 grants the memory access to the requestor selected by the ABMS 202.

The MAS 178 grants the access request that is selected by the SPS 206. In the exemplary embodiment, the SPS 206 selects the request provided by the ABMS 202 for service, so long as the ABMS 202 has a request pending from an allocated bandwidth requestor to be serviced, shown in FIG. 2 as requestors 212, 214, 216, 218 or 220, during the respective time slot of that requestor. In some embodiments, the plurality of allocated bandwidth memory requestors include a reassembly media write process 212, a reassembly media read process 214, a playback media write process 216, a playback media read process 218, and the application processor (control processor) 220. The reassembly media write process 212 writes to one or more buffers in memory 150 before storing the data in HDD array 141. The reassembly media read process 214 reads the data from the buffers in memory and passes it on for storage in the HDD array 141. The playback media write process 216 retrieves the data from the HDD array 141 for storage in buffers in memory 150 before the media stream is output (for playback). The playback media read process 218 reads the data from the buffers in memory 150 for outputting the stream (e.g., to GbE 131)

Each allocated bandwidth requestor is assigned a timeslot, and is granted access to memory 110 if that allocated bandwidth requester has a memory request to service during its allocated timeslot. If the ABMS 202 does not have a request pending for a given time slot, then the SPS 206 grants access to a request provided by the EBMS 204.

Thus, the MAS 178 makes a time slot available to each allocated bandwidth requester once per cycle of timeslots, but does not give an allocated bandwidth requestor more than one timeslot per cycle. MAS 178 may make multiple unused timeslots (in a given cycle) available to the control processor 150 for excess bandwidth accesses, but does not guarantee that any such excess timeslots will exist in any given cycle.

In the above example, the allocated bandwidth memory scheduler (ABMS) 202 handles all media reassembly and playback processes. The ABMS 202 ensures that media streaming can be sustained at line rate (by servicing allocated bandwidth requesters 212, 214, 216 and 218). Control processor accesses that are time critical can be routed through the ABMS 202, using the timeslot allocated for control processor access 220. Control processor accesses that are not time critical can be routed through the excess bandwidth memory scheduler (EBMS) 204.

One of ordinary skill can readily use the SPS 206, ABMS 202 and EBMS 204 to provide three classes of service. A requestor that can only request memory access by way of ABMS 202 (such as requesters 212, 214, 216 and 218) is ensured memory access with a pre-determined bandwidth. A requestor that can only request memory access by way of EBMS 204 (e.g., non-time critical control processor functions) can receive high memory access bandwidth when two or more requesters relinquish their memory access timeslots, but are given low memory access bandwidth when all of the allocated bandwidth requestors are accessing the memory. A requestor that can request memory access by way of both ABMS 202 and EBMS 204 is ensured at least a predetermined memory access bandwidth, and is given a higher bandwidth when two or more requestors are not using the memory.

The ABMS 202 polls the plurality of allocated bandwidth memory requestors to enable the plurality of allocated bandwidth memory requestors to access the single port memory 110 during respective allocated time slots.

Although the ABMS 202 described above includes five allocated bandwidth requesters, any number of allocated bandwidth requestors may be used, including numbers from two to five, and numbers greater than five.

In some embodiments, the ABMS 202 uses round-robin polling in each timeslot. In one example, the length of each timeslot is 10 clock cycles, the length of a period for polling all five of the allocated bandwidth requestors is 50 clock cycles, and the system clock operates at 125 MHz. Other timeslot lengths may be used.

In the exemplary embodiment, there are three excess bandwidth requestors. All three of the exemplary excess bandwidth requesters are functions of the control processor. To the extent that any type of allocated bandwidth requestor does not need to access the memory during its pre-allocated time slot, the MAS 178 makes the excess bandwidth (the unused time slot) available to control processor (AP) 150. In some embodiments, the three requestors include a control processor instruction bus memory access, a control processor data bus memory access, and other control processor memory accesses (for example, to populate a register internal to the TMA 100).

In some embodiments, the EBMS 204 uses a strict priority system, in which each excess bandwidth requestor has an assigned priority, and any excess access is granted to the requestor having the highest assigned priority among the excess bandwidth requestors that currently have an access request pending. In one embodiment, a control processor instruction bus memory access has the highest priority, a control processor data bus memory access has the next highest priority, and internal memory access requests have the lowest priority.

For memory read operation, the MAS 178 grants each type of read request at a respectively different time within each cycle of five timeslots, and the length of each timeslot may be 10 clock cycles, for example. The memory controller interface 160 collects memory read requests from all possible sources, and formulates a read request to memory 110 with a request start address and a request length.

For memory write operation, the MAS 178 grants each type of write request at different time within each 50 cycle period, and the minimum interval could be 10 clock cycles. The memory controller interface 160 collects memory write request from all possible sources, and formulates a write request to memory 110 with a request address and a request length.

Figure 3:
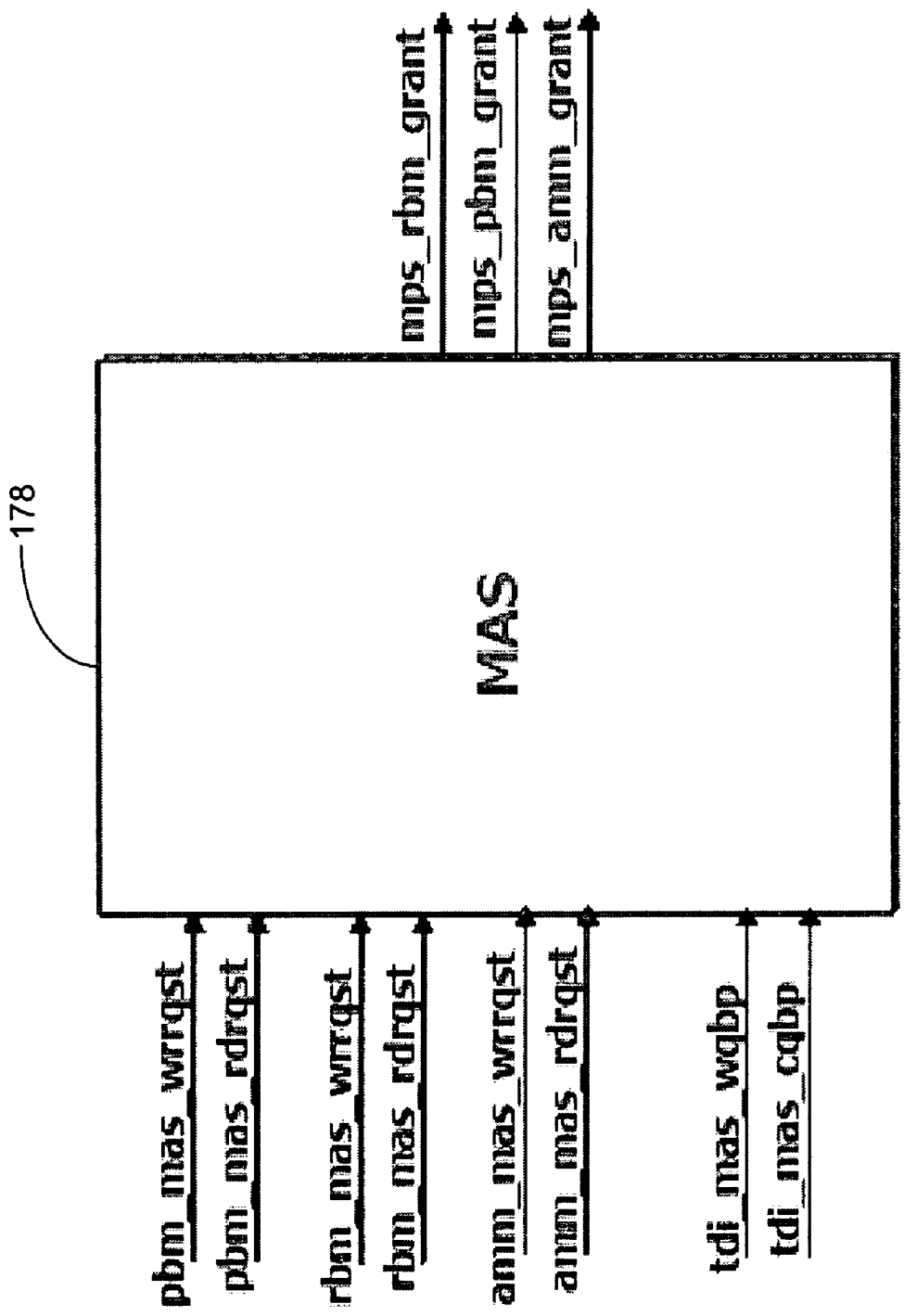
FIG. 3 is a data flow diagram showing signals received by and transmitted from the memory access scheduler of FIG. 2.

FIG. 3 is a data flow diagram summarizing the signals received and transmitted by MAS 178. The playback buffer manager (PBM) 174 receives requests by playback media write requester 216 and provides a write request signal (pbm_mas_wrrqst) to MAS 178. PBM 174 also receives requests by playback media read requestor 218 and provides a read request signal (pbm_mas_rdrqst) to MAS 178. The reassembly buffer manager (RBM) 172 receives requests by reassembly media write requestor 212 and provides a write request signal (rbm_mas_wrrqst) to MAS 178. RBM 172 also receives requests by reassembly media read requester 214 and provides a read request signal (rbm_mas_rdrqst) to MAS 178. The application processor memory manager (AMM) 176 provides a write request signal (amm_mas_wrrqst) and a read request signal (amm_mas_rdrqst) to MAS 178. The memory control interface 160 provides a write queue backpressure signal (tdi_mas_wqbp) and a command queue backpressure signal (tdi_mas_cqbp) to MAS 178. MAS 178 outputs an RBM grant signal (mps_rbm_grant) to RBM 172, a PBM grant signal (mps_pbm_grant) to PBM 174, and an AMM grant signal (mps_amm_grant) to AMM 176. The write queue backpressure signal causes MAS 178 to delay issuing the RBM and PBM grant signals, and the command queue backpressure signal causes MAS 178 to delay issuing the AMM grant signal.

The use of an implementation having an allocated bandwidth memory scheduler 202 and a separate excess bandwidth memory scheduler 204 allows easy implementation of a change to either of the requestors 202 or 204 without affecting the implementation of other requestor. Although the exemplary MAS 178 described above uses round robin polling for allocated bandwidth requesters, and allocates all unused memory access bandwidth to excess bandwidth requestors, other variations are contemplated by the inventors.

For example, although in the example above, all allocated bandwidth memory access timeslots are of the same length, in other embodiments (not shown), the timeslot lengths may be made different from each other without changing the EBMS 204.

In another embodiment (not shown) an unused access timeslot may be granted to another allocated bandwidth requester, (such as requestors 212, 214, 216 or 218), and the ABMS 202 only relinquishes a timeslot when none of the allocated bandwidth requestors has a memory access request. As a result, the excess bandwidth requesters only access the memory 110 when none of the allocated bandwidth requesters has a request for memory access.

In another example (not shown), the EBMS 204 may grant some accesses to the lower priority requestors, even through a higher priority access requestor has a request pending. For example, in one embodiment, the EBMS grants memory accesses to the control processor instruction bus, control processor data bus and internal access requests according to a predetermined ratio, such as 3:2:1, 5:2:1, or another ratio. This example involves a different EBMS 204 implementation, but does not affect the ABMS 202.

These are only a few examples of variants, and one of ordinary skill in the art can readily implement other variations to the ABMS 202 and/or EBMS 204 described above.

Figure 6:
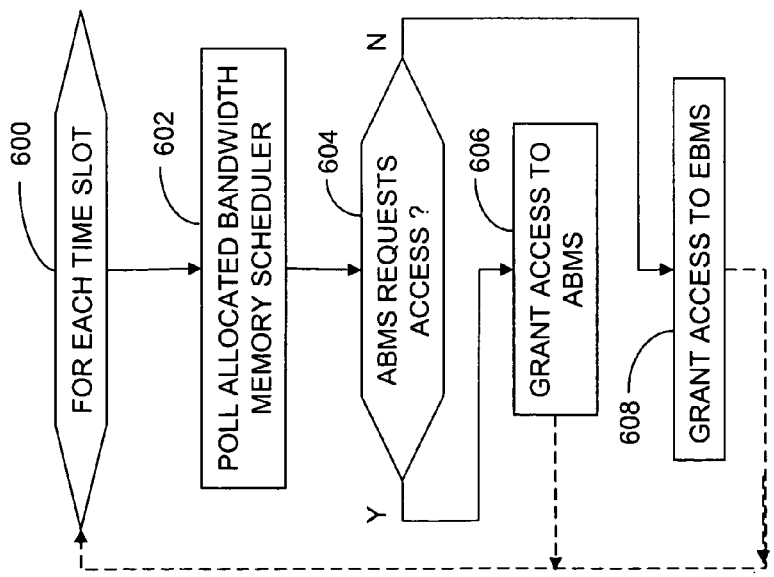
FIG. 6 is a flow chart diagram of the operation of the strict priority scheduler shown in FIG. 2.

FIG. 6 is a flow chart diagram showing the operation of the three schedulers in MAS 178.

At step 600, a loop including steps 602-608 is executed for each time slot.

At step 602, the SPS 206 polls the ABMS 202.

At step 604, if the ABMS 202 has a memory access request pending, then step 606 is skipped, and 608 is executed next. If the ABMS 202 has no memory access request pending, then step 606 is executed next.

At step 606, SPS 206 grants the request from EBMS 204.

At step 608, SPS 206 grants the request from ABMS 202.

Figure 7:
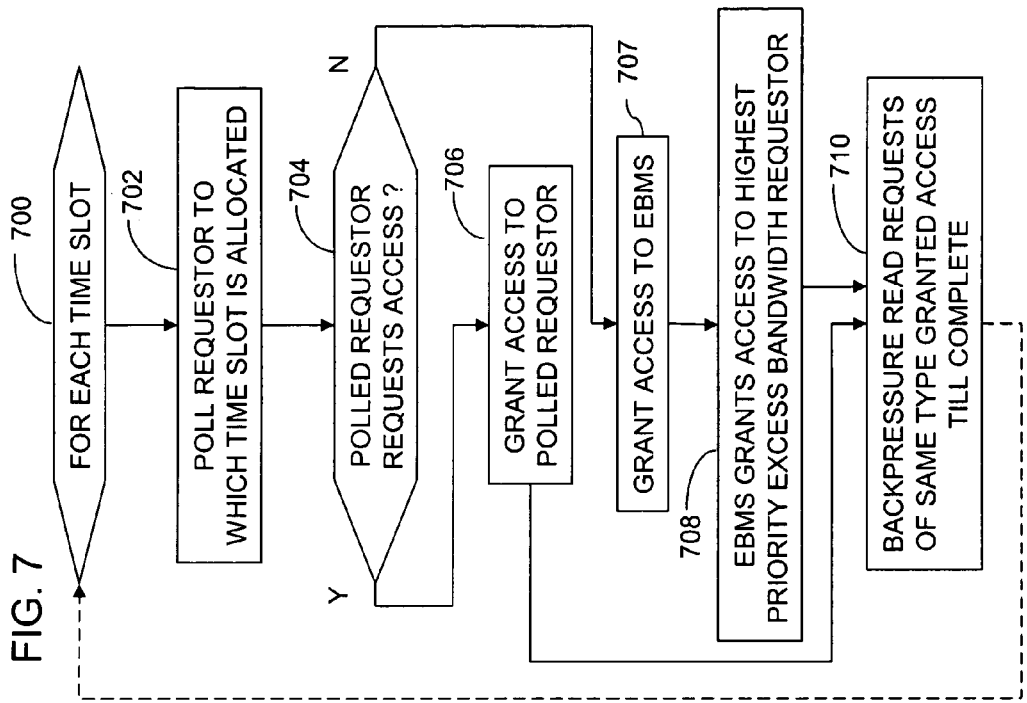
FIG. 7 is a flow chart diagram of the allocated bandwidth memory scheduler and excess bandwidth memory scheduler shown in FIG. 2.

FIG. 7 is a flow chart diagram showing how selection is made among individual requestors. In some embodiments, one of ordinary skill implements the operations of FIG. 7 using the three schedulers 202, 204 and 206 of FIG. 2.

At step 700, a loop including steps 702-710 is executed for each time slot.

At step 702, the ABMS 202 polls the individual requestor to which the current time slot is allocated. In this example, the timeslots are allocated in a round robin sequence to requests for reassembly media write requestor 212, reassembly media read requestor 214, playback media write requestor 216, playback media read requestor 218 and application (control) processor access requestor 220 in AP 150.

At step 704, if the polled requestor (212, 214, 216, 218 or 220) has a memory access request pending, then step 706 is executed next. If the polled requestor has no memory access request pending, then step 706 is skipped, and step 707 is executed next.

At step 706, if an allocated bandwidth requestor has a request, the ABMS 202 grants the request to the polled requestor.

At step 707, if no allocated bandwidth requestor has a request, the access is granted to the EBMS 204.

At step 708, EBMS 204 grants access to the highest priority excess bandwidth requester. In some embodiments, if a control processor instruction bus memory access request is pending, that request is granted. If no control processor instruction bus memory access request is pending, but a control processor data bus memory access is pending, then the data bus request is granted. If no control processor instruction or data bus request is pending, an internal memory access requests is granted access.

At step 710, while a read request is being handled by the memory controller interface 160, the memory controller interface 160 sends a backpressure signal to MAS 178 for delaying any additional read request from the same requestor, until the request currently granted access is completely satisfied.

In some embodiments, the MAS 178 can be implemented using programmable gate array logic. The following pseudocode summarizes the operation of an exemplary MAS. In the pseudocode, "BP" denotes backpressure, "GMemSched" denotes the ABMS 202, "EMemSched" denotes the EBMS 204, "DDR" denotes memory 110, and "TDI" denotes memory controller interface 160. This pseudocode is provided for an example in which each timeslot has a length of 10 memory cycles, and the polling cycle length for polling all five requestors is 50 memory cycles.

```
MemCycle = 0;
GService = 0; //   0:RR 1:RW 2:PR 3:PW 4:AP
EService = 4; //   AAP is the only one that is given EService
while (TRUE) { // Repeat this forever
   DDRWRBP = getDDRWRBP( );   // Obtain the signal from DDR via TDI for Write Queue BP
   DDRCMBP = getDDRCMBP( );   // Obtain the signal from DDR via TDI for Command Queue BP
   if (MemCycle mod 10 == 0) {
      GMemSched( );
      GService = (GService + 1) mod 5;
      if (GUR_SERVED == FALSE) { // No one was served through GMemSched
         EMemSched( ); // Try if the slot can be filled for someone else
      }
   }
   MemCycle = (MemCycle + 1) mod 50;
}
Function GMemSched( )
begin
   GUR_SERVED = FALSE;
   if (GService == 0 AND RBMWriteRequest == TRUE AND DDRWRBP == 0 AND DDRCMBP == 0) {
      // Perform write grant if not idle and not BPed
      GrantRBMWriteRequest( );
      GUR_SERVED = TRUE;
   }
   else if (GService == 1 AND RBMReadRequest == TRUE AND DDRCMBP == 0) {
      // Perform read grant if not idle and not BPed
      GrantRBMReadRequest( );
      GUR_SERVED = TRUE;
   }
   else if (GService == 2 AND PBMWriteRequest == TRUE AND DDRWRBP == 0 AND DDRCMBP == 0) {
      // Perform write grant if not idle and not BPed
      GrantPBMWriteRequest( );
      GUR_SERVED = TRUE;
   }
   else if (GService == 3 AND PBMReadRequest == TRUE AND DDRCMBP == 0) {
      // Perform read grant if not idle and not BPed
      Grant PBMReadRequest( );
      GUR_SERVED = TRUE;
   }
   else if (GService == 4 AND (AMMReadRequest == TRUE AND DDRCMBP == 0) OR
         (AMMWriteRequest == TRUE AND DDRCMBP == 0 AND DDRWRBP == 0)){
      // Perform read/write grant if not idle and not BPed
      if (AMMReadRequest == TRUE) {
         GrantAMMReadRequest( );
         GUR_SERVED = TRUE;
      }
      else if (AMMWriteRequest == TRUE) {
         GrantAMMWriteRequest( );
         GUR_SERVED = TRUE;
      }
   }
end
Function EMemSched( )
begin
   EX_SERVED = FALSE;
   if (AMMReadRequest == TRUE AND DDRCMBP == 0) OR
         (AMMWriteRequest == TRUE AND DDRCMBP == 0 AND DDRWRBP == 0){
      // Perform read/write grant if not idle end not BPed
      if (AMMReadRequest == TRUE) {
         GrantAMMReadRequest( );
         EX_SERVED = TRUE;
      }
      else if (AMMWriteRequest == TRUE AND (GService != 1 OR GService != 3)) {
         // In order to avoid TDI conflict, the Read Opportunities by RBM/PBN
         // is not used for AMM write.
         GrantAMMWriteRequest( );
         EX_SERVED = TRUE;
      }
   }
end
```

Memory Controller Interface

The memory controller interface (MCI) 160 controls access to the memory 110 by the requestors 212, 214, 216, 218, 220, to which the MAS 178 grants access.

Figure 4:
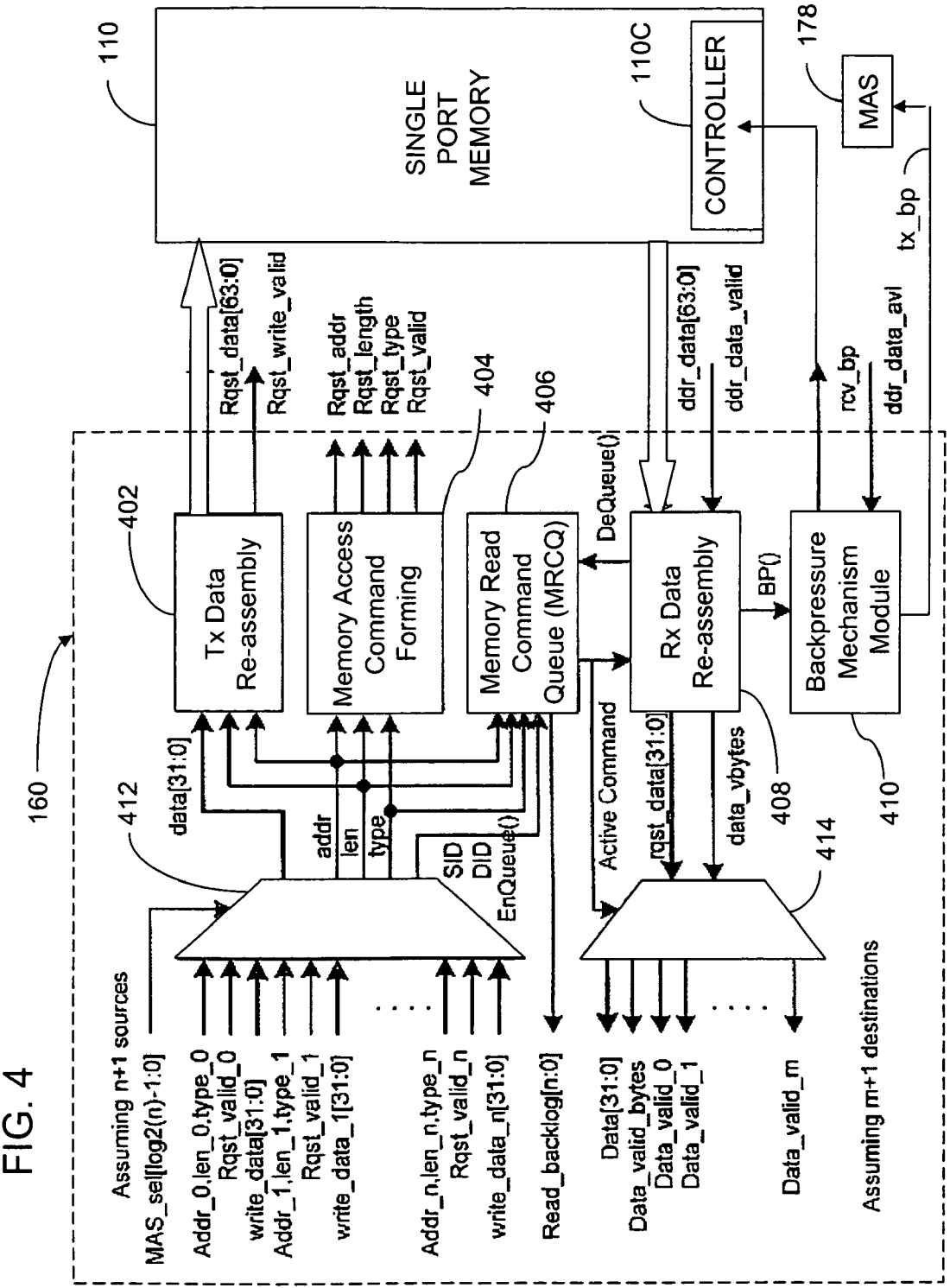
FIG. 4 is a block diagram of the memory controller interface shown in FIG. 1.

FIG. 4 is a block diagram of an exemplary embodiment of the MCI 160 shown in FIG. 1. The MCI 160 allows multiple media sessions to share the single port DDR memory 110 with high bandwidth. In some embodiments, the MCI 160 is implemented using programmable gate array logic. Other embodiments include application specific integrated circuits.

A multiplexer 412 receives a plurality of (n+1) of 32-bit data signals and n+1 sets of corresponding parameters, including address, request length, request type, and valid bit. MAS 178 provides a mux select signal to multiplexer 412, to select the stream that is passed to Tx data re-assembly function 402, memory access command forming function 404, and a memory read command queue structure 406. Tx Data re-assembly function 402 handles re-assembly, pad data, and transformation of the data from a 32-bit signal to a 64-bit signal. The memory access command forming function 404 provides an address, length, type and valid bit to the memory 110 to enable the read or write operation. Memory read command queue (MRCQ) structure 406 manages all the memory read accesses. While memory 110 provides data to Rx data re-assembly function 408, MRCQ 406 provides the corresponding read command parameters to Rx data re-assembly function 408. Rx data re-assembly function 408 handles re-assembly, pad data, and transformation of the data from a 64-bit signal to a 32-bit signal. Rx data re-assembly function 408 outputs the requested data to a demultiplexing structure 414, while MRCQ 406 provides the request length and destination identification to structure 414. The demultiplexing structure 414 outputs the returned data to the destination.

For a memory read request, the start address offset varies from 0 to 7, and the request length varies from 1 to 64 bytes. The Rx data re-assembly function 408 performs data re-assembly and padding with reference to the request start address offset and request length of the active read command.

Similarly, the Tx data re-assembly function 402 determines whether a request for memory access (by the memory requestor that is currently granted access) is a request to write data to the single port memory 110 at an address that is aligned with a predetermined 8-byte boundary. If the address is not aligned with an 8-byte boundary, Tx data re-assembly function 402 provides the data to be written to the memory 110, with padding data between the predetermined 8-byte boundary and the start address of the read. The DDR memory controller 110c ignores the pad data and writes the data to be written into the memory 110 beginning at the correct address.

A backpressure mechanism module 410 provides backpressure signals (rcv_bp) to the memory controller 110c of the single port memory 110, so that there is no data buffer requirement in the receive direction (i.e., for data being received from the LAN interface 131/USB interface 130 and stored to disk). A backpressure mechanism between the MCI 160 and local subblocks (RBM 172, PBM 174 and AMM 176) provides a backpressure signal (tx_bp) to MAS 178, so that MCI 160 does not require any data buffer in the transmit direction.

In embodiments using single-port DDR-2 RAM, according to the DDR controller requirements, data written into or read out from memory 110 are always aligned to an 8-byte address boundary, regardless of the address offset of the requested data. When a request for data has a starting address that is not aligned with an 8-byte boundary, the memory controller interface 160 performs data re-assembly and padding according to the start address offset. In some embodiments, the DDR controller of memory 110 has a 64-bit data bus, and the memory controller interface 160 has a 32-bit local data bus. To accommodate this bus width difference, the Rx and Tx re-assembly functions also include a 32-bit to 64-bit translation function.

Memory Read Command Queue Structure

When the memory 110 feeds back requested data, the memory does not indicate to which request does the data corresponds. Further, if the memory 110 is a DDR memory, the delay time between issuance of a read request and the time when data are returned is not fixed; the data may be fed back in a burst (e.g., data requested by two consecutive requests are returned back-to-back). In other situations, a DDR memory may break up the requested data into two bursts (or some may be delivered as a burst, and the remainder is delivered shortly thereafter).

The exemplary MCI 160 accommodates all these possible scenarios. To facilitate all the read memory operations, a memory read command queue (MRCQ) 406 is maintained. The MRCQ 406 stores information defining each memory read request, and outputs the information at the same time the corresponding data are returned by the memory 110. This enables the Rx Data re-assembly block 408 to handle the returned data and deliver the data to the correct destination.

Figure 8:
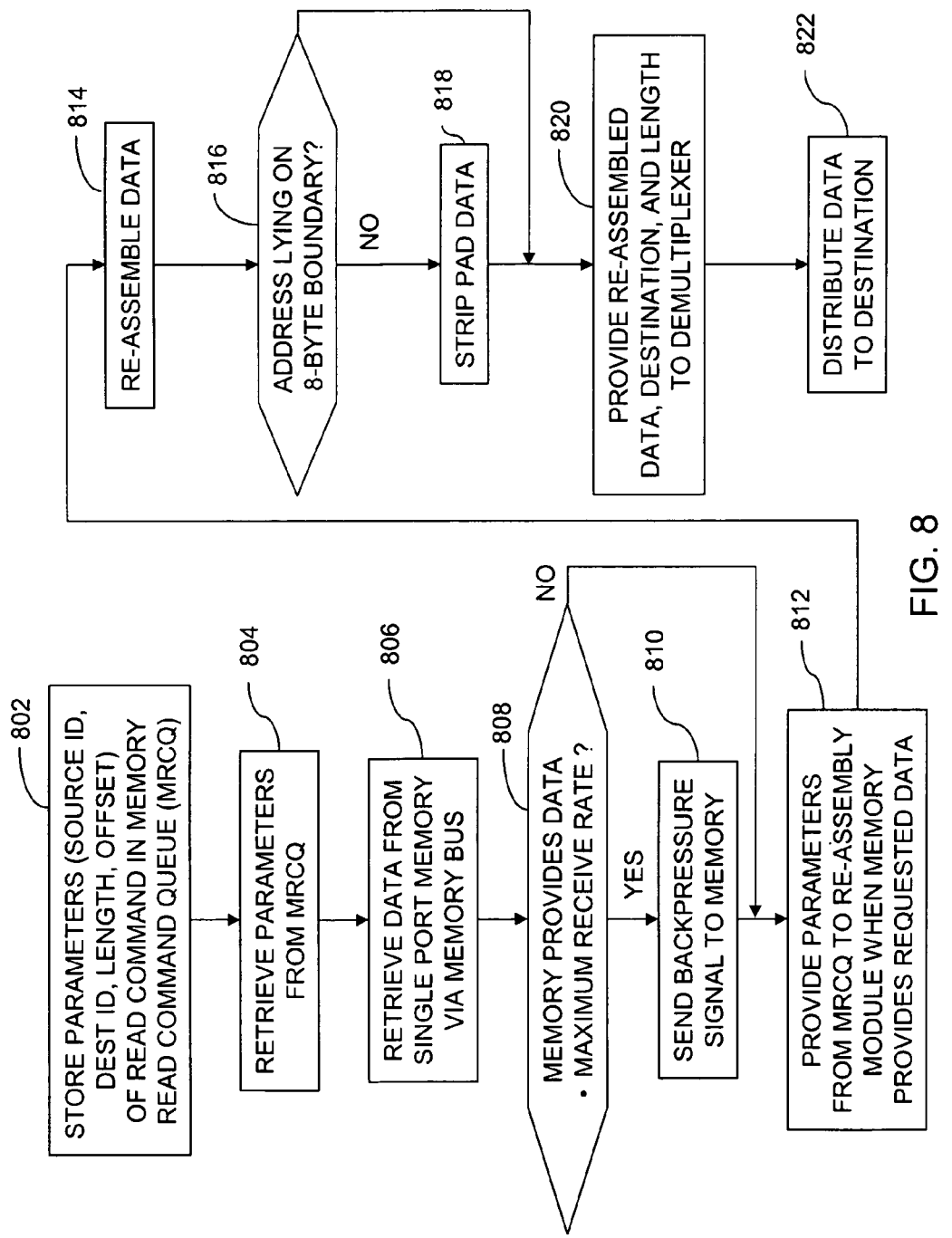
FIG. 8 is a flow chart diagram showing operation of the memory controller interface shown in FIG. 1.

FIG. 8 is a flow chart diagram of an exemplary method performed by the MRCQ 406.

At step 802, the MCI 160 receives a plurality of read commands for memory read access from a plurality of requestors under control of the MAS 178, and stores a respective plurality of parameters corresponding to each of the plurality of read commands in the MRCQ 406. The stored parameters include source ID (SID), destination ID (DID), the offset of the first byte relative to an 8-byte boundary (RqstAddrOff) and the request length (RqstLen).

At step 804, Rx data re-assembly block 408 sends a DeQueue signal to the MRCQ 406, causing the MRCQ to access the next read command stored in the MRCQ. The parameters corresponding to the next one of the read commands are retrieved from the MRCQ 406.

At step 806 the single port memory 110 provides the data corresponding to the active read command to the Rx data re-assembly block 408, while the MRCQ 406 provides the retrieved parameters to function 408.

At step 808, if the memory 110 provides data at (or above) the maximum receive rate, step 810 is executed. Otherwise, step 810 is skipped and step 812 is executed next.

At step 810, the backpressure mechanism module 410 sends the backpressure signal rcv_bp to the memory controller 110c. Memory controller 110c delays further transmission to Rx data re-assembly function 408 so long as backpressure mechanism module 410 continues to send the backpressure signal rcv_bp.

At step 812, MRCQ 406 provides all four of the retrieved parameters (SID, DID, RqstAddrOff and RqstLen) to Rx data re-assembly function 408, when memory 110 provides the requested data.

At step 814, Rx data re-assembly function 408 re-assembles the data for the 32-bit local bus.

At step 816, Rx data re-assembly function 408 determines whether the active command (the request for memory access by the memory requestor that is currently granted access) requests data that are stored in the single port memory 110 at an address that is aligned with a predetermined 8-byte boundary. If the address of the requested data does not coincide with an 8-byte boundary, step 818 is executed. Otherwise, step 818 is skipped and step 820 is executed next.

At step 818, Rx data re-assembly block 408 strips any pad data between the predetermined 8-byte boundary and the address, by reading the data beginning with the address indicated by the RqstAddrOff parameter, and ignoring whatever data are stored in the memory 110 at addresses that precede the requested start address.

At step 820, Rx data re-assembly block 408 outputs the data and valid bits therefore to the demultiplexing structure 414, while MRCQ 406 provides the DID and RqstLen parameters to the demultiplexing structure 414, thus providing one or more of the plurality of parameters from the memory read command queue to multiplexing structure 414 while the data from the memory 110 are provided to multiplexing structure 414.

At step 822, demultiplexing structure 414 distributes the data to the destination identified by the DID parameter.

In some embodiments, the MRCQ 406 is a first-in, first-out (FIFO) linked list. FIG. 5 is a block diagram of an embodiment of an MRCQ 406, which is a linked list of command records 504, including an active command 504a which is currently being serviced by memory 110. The "last enqueued" command record is most recently stored in MRCQ, and is serviced after all the other valid commands. An element or record of the exemplary MRCQ 406 includes four parameters: source ID (SID), destination ID (DID), the offset of the first byte relative to an 8-byte boundary (RqstAddrOff) and the request length (RqstLen). In the exemplary embodiment, the SID (Source ID) indicates the request type (e.g., RBM 172, PBM 174 or AMM 176). DID (destination ID) indicates the request destination, which may be the Ethernet port GbE 131, peripheral port USB 130, HDD array 141 or the control processor 110. RqstAddrOff (request address offset) indicates the three least significant bits of a read request. RqstAddrOff is used for data re-assembly. In the exemplary embodiment, MRCQ may have five read valid commands 504. Once a command is serviced and the data for that command are delivered, the valid bit of the command is reset, changing the command record 504 to an invalid record 502. The record 502 of the invalid command can be overwritten by a new read command.

In the exemplary embodiment, there may be up to five read requests under way at a specific time: one receive re-assembly read, one (transmit) playback read and another three control processor read operations. The three control processor operations include an instruction read, a data read, and an "internal read operation" that provides data to a register internal to MCI 160. Therefore, in this example, the MRCQ 406 is a five-item read command queue.

Backpressure Mechanism

MCI 160 includes a backpressure mechanism module 410, to generate and transmit backpressure signals to the memory 110 and the MAS 178. The backpressure signals cause the recipients of the signal to delay transmission of additional data, or to re-transmit the most recently sent data, so that MCI 160 does not require a large data buffer for write or read operations. Backpressure module 410 transmits a respective backpressure signal tx_bp to MAS 178 for each type of read request, to prevent the internal blocks 172, 174, 176 from delivering data faster than the MCI 160 can process and output the data. Similarly, backpressure module 410 transmits a backpressure signal rcv_bp to the DDR memory controller 110c to prevent memory 110 from delivering data faster than the MCI 160 can process and output the data.

Backpressure Mechanism to Internal Sub-blocks

Whenever a read request is in process, the MCI 160 sends a backpressure signal (rcv_bp) to the requestor, which then delays the same type of further read request until the requested data has been fed by DDR 110. That is, while a read request from RBM 172 is processed, a backpressure signal is sent to RBM 172; while a read request from PBM 174 is processed, a backpressure signal is sent to PBM 174; while a read request from AMM 176 is processed, a backpressure signal is sent to AMM 176.

Backpressure Mechanism With DDR Memory Controller

In some embodiments, the DDR controller 110c is connected to a 64-bit data bus, while the local interface within the MCI 160 is a 32-bit bus, so the MCI 160 performs data translation. The exemplary MCI 160 does not have data buffers, so the exemplary MCI 160 provides a backpressure signal rcv_bp to the DDR controller 110c to prevent the memory 110 from transmitting two back-to-back transmissions. The second transmission from memory 110 is delayed until the MCI 160 has output the first 64 bits.

Also, taking the request start address offset and all possible request lengths into account, the backpressure mechanism 410 allows the MRCQ 406 to update its active command. In one example, the MAS 178 delays issuing the next grant signal by one clock cycle (and thus delays the next request sent by one of the requestors 172, 174, 176 to the MCI 160 by one clock cycle), while the MRCQ 406 updates its active command. Otherwise, at the end of a transfer, if a back-to-back 64-bit transfer occurs, then the receiver 408 could distribute the data to a wrong destination (i.e., if the MRCQ 406 updates the active read command earlier or later than expected).

Thus, the memory access scheduler 178 and the memory controller interface 160 provide an efficient way to manage multiple media sessions to share a single port DDR memory 110. In one embodiment, these two components are used together to provide the following bandwidth allocations:

Using the above described structures, MCI 160 services a 64-byte write request and a 64-byte read request during re-assembly process, a 64-byte write request and a 64 byte read request during a playback process, and a 32-byte control processor request during a control processor request. In one embodiment, the following data rates are achieved:

Re-assembly Media Read: 1.2 Gbps
Re-assembly Media Write: 1.2 Gbps
Playback Media Read: 1.2 Gbps
Playback Media Write: 1.2 Gbps
Control Processor Access: 0.6 Gbps The above described example provides an efficient way for multiple media sessions to share a port single DDR memory 110 and meet high bandwidth requirements, allowing lower complexity in a DDR 2 memory controller design. This structure and method provide higher expansibility for future applications.

The present invention may be embodied in the form of computer-implemented processes and apparatus for practicing those processes. The present invention may also be embodied in the form of computer program code embodied in tangible media, such as floppy diskettes, read only memories (ROMs), CD-ROMs, hard drives, ZIP™ disks, flash memories, or any other computer-readable storage medium, wherein, when the computer program code is loaded into and executed by a computer, the computer becomes an apparatus for practicing the invention. The present invention may also be embodied in the form of computer program code, for example, whether stored in a storage medium, loaded into and/or executed by a computer, or transmitted over some transmission medium, such as over the electrical wiring or cabling, through fiber optics, or via electromagnetic radiation, wherein, when the computer program code is loaded into and executed by a computer, the computer becomes an apparatus for practicing the invention. When implemented on a general-purpose processor, the computer program code segments configure the processor to create specific logic circuits.

Although the invention has been described in terms of exemplary embodiments, it is not limited thereto. Rather, the appended claims should be construed broadly, to include other variants and embodiments of the invention, which may be made by those skilled in the art without departing from the scope and range of equivalents of the invention.

What is claimed is:

1. A method for controlling access to a single-port memory, comprising the steps of:
    allocating a plurality of time slots to a plurality of memory requesters so that each of the plurality of memory requesters has a pre-allocated time slot;
    polling each of the plurality of memory requesters to enable each of the plurality of memory requesters to access a single port memory during its respective pre-allocated time slot;
    granting each one of the plurality of memory requesters access to the single-port memory during its pre-allocated time slot, if that requester requests access to the single-port memory; and
    granting an excess bandwidth requester access to the single port memory during a time slot allocated to one of the plurality of memory requesters that does not request access to the single-port memory during its pre-allocated time slot.

2. The method of claim 1, wherein:
    the plurality of memory requesters include at least one memory read requester, at least one memory write requester, and at least one control processor, and
    the control processor is the excess bandwidth requester.

3. The method of claim 2, wherein the at least one memory read requester includes, a reassembly read requester and a playback read requester, and the at least one memory write requester includes a reassembly write requester and a playback write requester.

4. The method of claim 2, further comprising:
    storing a plurality of parameters of at least one read command from said at least one memory read requester in a memory read command queue;
    retrieving said plurality of parameters from the memory read command queue when the single port memory provides the data corresponding to that read command;
    receiving data from said single port memory according to said plurality of parameters; and
    providing one or more of the plurality of parameters from the memory read command queue while providing the data provided from the memory.

5. The method of claim 4, wherein the one or more parameters provided from the memory read command queue include:
    a request length, and
    a destination identification.

6. The method of claim 1, further comprising:
    determining whether a request for memory access by the memory requester that is currently granted access requests data that are stored in the single port memory at an address that is aligned with a predetermined 8-byte boundary; and
    stripping data between the predetermined 8-byte boundary and the address, if the address is not aligned with the predetermined on an 8-byte-boundary.

7. The method of claim 1, further comprising:
    determining whether a request for memory access by the memory requester that is currently granted access is a request to write data to the single port memory at an address that is aligned with a predetermined 8-byte boundary;
    providing the data to be written to the memory, with padding data between the predetermined 8-byte boundary and the address, if the address is not aligned with the predetermined 8-byte boundary; and
    writing the data to be written into the memory beginning at the address.

8. The method of claim 1 further comprising providing a backpressure signal to a controller of the single port memory to prevent the single port memory from delivering too much data in a given period of time.

9. The method of claim 1 further comprising providing a backpressure signal to a memory access scheduler that performs the polling and granting steps, to prevent a plurality of memory write requesters from providing too much data for storage in the single port memory in a given period of time.

10. A method of accessing a single port memory comprising:
    polling each of a plurality of memory requesters to enable each of the plurality of memory requesters to access a single port memory during its respective pre-allocated time slot;
    receiving a plurality of read commands for memory read access from the plurality of requesters;
    storing a respective plurality of parameters corresponding to each of the plurality of read commands including a request length in a memory read command queue;
    retrieving the parameters corresponding to one of the read commands from the memory read command queue when the single port memory provides the data corresponding to that read command; and
    providing one or more of the parameters from the memory read command queue while providing the data from the memory.

11. The method of claim 10, wherein the one or more parameters provided from the memory read command queue further includes:
    a destination identification.

12. The method of claim 10, wherein the stored plurality of parameters further includes:
    a source identification,
    a destination identification, and
    a request address offset.

13. The method of claim 10, further comprising:
    determining whether the one of the plurality of read commands has requested data that are stored in the single port memory at an address that is aligned with a predetermined 8-byte boundary; and
    stripping data between the predetermined 8-byte boundary and the address, if the address is not aligned with the predetermined on an 8-byte-boundary.

14. The method of claim 10, further comprising providing a backpressure signal to a controller of the single port memory to prevent the single port memory from delivering too much data in a given period of time.

15. A system for controlling access to. a single-port memory, comprising:
    a processor including a memory access scheduler, the memory access scheduler configured to pre-allocate one or more time slots to each of a plurality of memory requesters and poll the plurality of memory requesters to enable each of the plurality of memory requesters to access a single port memory during its respective pre-allocated time slot, the memory access scheduler configured to grant each one of the plurality of memory requesters access to the single-port memory during its pre-allocated time slot, if that requester requests access to the single-port memory, the memory access scheduler configured to grant an excess bandwidth requestor access to the single port memory during a time slot allocated to one of the plurality of memory requesters that does not request access to the single-port memory during its pre-allocated time slot; and a memory controller interface connected to the memory access scheduler for controlling access to the single-port memory by the memory requester to which access is granted.

16. The system of claim 15, wherein the memory controller interface includes:

a memory read command queue configured to store a plurality of parameters of at least one read command from said at least one memory read requester, the memory read command queue configured to provide one or more of the plurality of parameters when data are provided by the single port memory in response to the at least one read command.

17. The system of claim 16, further comprising:

a re-assembly module configured to receive data from the single port memory and use the plurality of parameters from the memory read command queue to re-assemble the received data for transmission to a destination.

18. The system of claim 16, wherein the memory read command queue includes a first-in, first-out linked list of read commands.

19. A computer readable storage medium encoded with computer program code, wherein, when the computer program code is executed by a processor, the processor performs a method for controlling access to a single-port memory, comprising the steps of:

allocating a plurality of time slots to a plurality of memory requesters so that each of the plurality of memory requesters has a pre-allocated time slot;

polling each of the plurality of memory requesters to enable each of the plurality of memory requesters to access a single port memory during its respective pre-allocated time slot;

granting each one of the plurality of memory requesters access to the single-port memory during its pre-allocated time slot, if that requester requests access to the single-port memory; and granting an excess bandwidth requestor access to the single port memory during a time slot allocated to one of the plurality of memory requesters that does not request access to the single-port memory during its pre-allocated time slot.

20. A computer readable storage medium encoded with computer program code, wherein, when the computer program code is executed by a processor, the processor performs a method of accessing a single port memory comprising:

polling each of a plurality of memory requesters to enable each of the plurality of memory requesters to access a single port memory during its respective pre-allocated time slot;

receiving a plurality of read commands for memory read access from the plurality of requesters;

storing a respective plurality of parameters corresponding to each of the plurality of read commands including a request length in a memory read command queue;

retrieving the parameters corresponding to one of the read commands from the memory read command queue when the single port memory provides the data corresponding to that read command; and providing one or more of the parameters from the memory read command queue while providing the data from the memory.

* * * * *